United States Patent
Alwabel et al.

(10) Patent No.: US 10,011,536 B1
(45) Date of Patent: Jul. 3, 2018

(54) ENCAPSULATED SUSTAINED RELEASE UREA FERTILIZER

(71) Applicant: KING SAUD UNIVERSITY, Riyadh (SA)

(72) Inventors: Mohammad Ibrahim Mohammad Alwabel, Riyadh (SA); Jamal Tagelsir Elsheikh, Riyadh (SA); Adel Rabie Usman, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/710,735

(22) Filed: Sep. 20, 2017

(51) Int. Cl.
| | |
|---|---|
| *C05C 9/00* | (2006.01) |
| *C05G 3/00* | (2006.01) |
| *C05C 9/02* | (2006.01) |
| *C05C 1/02* | (2006.01) |
| *C05C 11/00* | (2006.01) |

(52) U.S. Cl.
CPC ............ *C05G 3/0029* (2013.01); *C05C 9/005* (2013.01); *C05C 9/02* (2013.01); *C05G 3/0082* (2013.01); *C05G 3/0094* (2013.01); *C05C 1/02* (2013.01); *C05C 9/00* (2013.01); *C05C 11/00* (2013.01); *C05G 3/0041* (2013.01); *C05G 3/0076* (2013.01)

(58) Field of Classification Search
None
See application file for complete search history.

(56) References Cited

U.S. PATENT DOCUMENTS

| | | | | |
|---|---|---|---|---|
| 3,961,932 A | * | 6/1976 | Miller | ........................ C05B 1/02 71/1 |
| 4,013,442 A | * | 3/1977 | Kawar | ...................... B01J 2/006 427/180 |
| 4,082,533 A | * | 4/1978 | Wittenbrook | ........... C05C 9/005 71/28 |
| 4,711,659 A | * | 12/1987 | Moore | ...................... C05C 9/00 504/231 |
| 4,804,403 A | * | 2/1989 | Moore | ...................... C05C 9/00 71/28 |
| 4,808,206 A | | 2/1989 | Smith | |
| 5,030,267 A | * | 7/1991 | Vlnaty | ................. C05G 3/0041 428/404 |

(Continued)

FOREIGN PATENT DOCUMENTS

| | | |
|---|---|---|
| CN | 103664368 A | 3/2014 |
| CN | 103772010 A | 5/2014 |

(Continued)

OTHER PUBLICATIONS

Daniela Denisse Castro-Enriquez, "Preparation, Characterization and Release of Urea from Wheat Gluten Electrospun Membranes," Materials (5) pp. 2903-2916 (2012).

(Continued)

*Primary Examiner* — Wayne Langel
(74) *Attorney, Agent, or Firm* — Richard C. Litman (57) ABSTRACT

The encapsulated sustained release urea fertilizer is a urea fertilizer and a stabilizer encapsulated in fumed silica. The stabilizer may be a gellan gum hydrogel or biochar. The encapsulated sustained release urea fertilizer allows for both immediate and sustained nitrogen release over time and displays reduced nitrogen volatilization and increased water holding capacity.

9 Claims, 8 Drawing Sheets

(56) References Cited

U.S. PATENT DOCUMENTS

| | | | | |
|---|---|---|---|---|
| 5,176,734 | A * | 1/1993 | Fujita | C05G 3/0029 |
| | | | | 71/11 |
| 6,193,775 | B1 * | 2/2001 | Fujita | C05G 3/0035 |
| | | | | 71/27 |
| 6,336,949 | B1 * | 1/2002 | Patra | C05C 9/005 |
| | | | | 71/28 |
| 8,361,186 | B1 * | 1/2013 | Shearer | C05F 5/00 |
| | | | | 252/373 |
| 2004/0102328 | A1 | 5/2004 | Johnson | |
| 2010/0059704 | A1 * | 3/2010 | Davis | B82Y 30/00 |
| | | | | 252/79.1 |
| 2014/0260470 | A1 * | 9/2014 | Taulbee | C05C 1/02 |
| | | | | 71/30 |
| 2015/0052960 | A1 * | 2/2015 | Makin | C05C 1/00 |
| | | | | 71/30 |
| 2015/0313212 | A1 * | 11/2015 | Alexander | C05C 9/00 |
| | | | | 504/144 |
| 2015/0329435 | A1 * | 11/2015 | Hardy | A01N 25/04 |
| | | | | 424/529 |
| 2016/0175797 | A1 * | 6/2016 | Potthoff | B01J 8/1872 |
| | | | | 427/213 |
| 2016/0304411 | A1 * | 10/2016 | Waliwitiya | C05C 9/00 |

FOREIGN PATENT DOCUMENTS

| | | | |
|---|---|---|---|
| CN | 105016857 | A | 11/2015 |
| CN | 105175174 | A | 12/2015 |
| CN | 106380314 | A | 2/2017 |
| CN | 106831154 | * | 6/2017 |
| JP | 9194282 | A | 7/1997 |

OTHER PUBLICATIONS

Defne Altan et al., "Formation and stability of dry water for storage and transportation of aqueous solutions", published at //defnealtan.com/Defne_Altans_website/Articles_files/Dry%20Water%20Project.pdf, printed Aug. 16, 2017, 22 pages.

Sempeho et al., "Meticulous Overview on the Controlled Release Fertilizers", Advances in Chemistry, vol. 2014, Article 363071 (2014), 16 pages.

* cited by examiner

ENCAPSULATED SUSTAINED RELEASE UREA FERTILIZER

BACKGROUND

1. Field

The disclosure of the present patent application relates to fertilizers, and more particularly, to an encapsulated sustained release urea fertilizer.

2. Description of the Related Art

Nitrogen loss from common fertilizers is both a significant cost factor and an environmental problem. Runoff can lead to loss of the majority of the available nitrogen in a fertilizer treatment. This lost nitrogen commonly ends up in rivers and streams, resulting in environmental damage, such as algae blooms. Further nitrogen loss may result from environmental factors, such as denitrification, leaching, and volatilization.

Recent efforts to reduce nitrogen loss have focused on developing slow-release fertilizers. These fertilizers commonly include sulfur-coated urea, or urea coated with sulfur in combination with a polymer top-coat. A sulfur coating slows the release of nitrogen from the fertilizer. However, this renders the nitrogen release irregular, as the rate of sulfur coating breakdown and nitrogen release depends upon several variables, including temperature, moisture, pH, salinity, soil texture, and microbial activity. Polymer-coated fertilizers reduce this irregularity using membranes that break down in a predictable manner, based primarily upon temperature and moisture. However, these fertilizers tend to be slow to initiate release, and therefore cannot provide an immediate and sustained effect. They also do not protect against environmental loss mechanisms, such as run-off.

Thus, an encapsulated sustained release urea fertilizer solving the aforementioned problems is desired.

SUMMARY

The encapsulated sustained release urea fertilizer includes a urea fertilizer encapsulated in fumed silica. The composition may also include gellan gum hydrogels or biochar as a stabilizer.

Encapsulation of the a urea fertilizer in fumed silica in the presence of a stabilizer results in an encapsulated nitrogen fertilizer capable of both immediate and sustained release of nitrogen over a period of at least one month. This encapsulated sustained release urea fertilizer further reduces nitrogen loss through volatilization or run-off effects, at least in part due to increased water-holding capacity.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The encapsulated sustained release urea fertilizer includes a urea fertilizer encapsulated in fumed silica and a stabilizer. The stabilizer may be a gellan gum hydrogel or biochar.

Many factors may contribute to the breakdown and release of ammonia from urea in soil fertilizers. Soil enzymes, such as urease, may contribute, as may thermolysis and hydrolysis. Encapsulation of urea fertilizer in fumed silica in the presence of a stabilizer, as described herein, results in an encapsulated nitrogen fertilizer capable of both immediate and sustained release of nitrogen over a period of at least a month. This encapsulated sustained release urea fertilizer further impairs nitrogen loss through volatilization or run off effects, at least in part through increased water holding capacity.

The stabilizer may be gellan gum or biochar. The gellan gum may be formed into a gellan gum hydrogel prior to addition to the fertilizer.

The encapsulated sustained release urea fertilizer may be produced by mixing the urea fertilizer with the fumed silica in order to encapsulate the urea fertilizer. Different concentrations of fumed silica may be used to alter the nitrogen release kinetics of the final composition. Further details of the method of making an encapsulated sustained release urea fertilizer may be found in the examples below.

Example 1

Preparation of Encapsulated Gel-Forming Urea

Hydrophobic nano-fumed silica (AEROSIL® R812), with a surface area of 260±30 m²/g, a pH of 5.5, and a carbon content of 2-3% was sourced from Sigma-Aldrich Co. LLC. A Waring Pro MX1000R blender was used to mix 90 mL of deionized water and 10 g of nano-fumed silica particles at 14,000 rpm for 10 seconds at room temperature. The resulting mixture (dry water, i.e., a powder-like substance formed by mixing water and silica at high speeds for storage or transport of aqueous solutions) was transferred into glass bottles. This test confirmed the appropriate speed and time for this blender to convert an aqueous solution and fumed silica in a volume of approximately 100 mL to dry water form, i.e., to encapsulate micro-sized droplets of water in a shell of silica. A 46-0-0 urea fertilizer was sourced from SABIC (see Table 1). A urea solution was formed by 200 g of the urea fertilizer dissolved in 1000 ml deionized water. The following sample solutions were prepared: (1) 50% (w/v) urea solution (UF); (2) 95 ml of urea solution and 5 g fumed silica (UFFS1); (3) 90 ml of urea solution and 10 g fumed silica (UFFS2); (4) 1 g gellan gum and 10 g fumed silica dissolved in 90 ml urea solution (UFFSG); and (5) 9 g fumed silica and 1 g biochar dissolved in 90 ml urea solution (UFFSB). The Waring Pro MX1000R blender was then used to mix the sample solutions, and additional deionized water was added to bring each sample solution up to a total volume of 100 mL. Thus, the UFFS1 sample solution contained 5% fumed silica wt/vol ((5 g/100 mL)× 100=5%), the UFFS2 sample solution contained 10% fumed silica wt/vol, etc. These solutions were encapsulated in dry water form by mixing at 14,000 rpm for 10 seconds at room temperature using the Waring Pro MX1000R.

TABLE 1

SABIC Urea Fertilizer Data Sheet

| Properties | Units | Typical Value |
| --- | --- | --- |
| Total Nitrogen | % | Min 46 |
| Biuret | % | Max 1.0 |
| Moisture | % | Max 0.5 |
| Formaldehyde | % | Min 0.45 |
| Crushing Strength | Kg | Min 2 |
| Friability | % | 100 |
| Drying | — | N/A |
| Free Ammonia | ppm | 60-100 |
| Particle Size Distribution | | |
| Granular 2-4 MM | % | Min 90 |
| Prills 1-2.8 MM | % | Min 90 |
| Melting Point | °C. | ~132 |
| Color | | White |
| Radiation | — | Free from radioactive material |
| Free Flowing | % | 100 |
| Safety Aspects | — | Free from harmful substances |
| Anti-Caking | — | Treated with anti-caking agent |

Example 2

Kinetic Release Experiment

Figure 1:
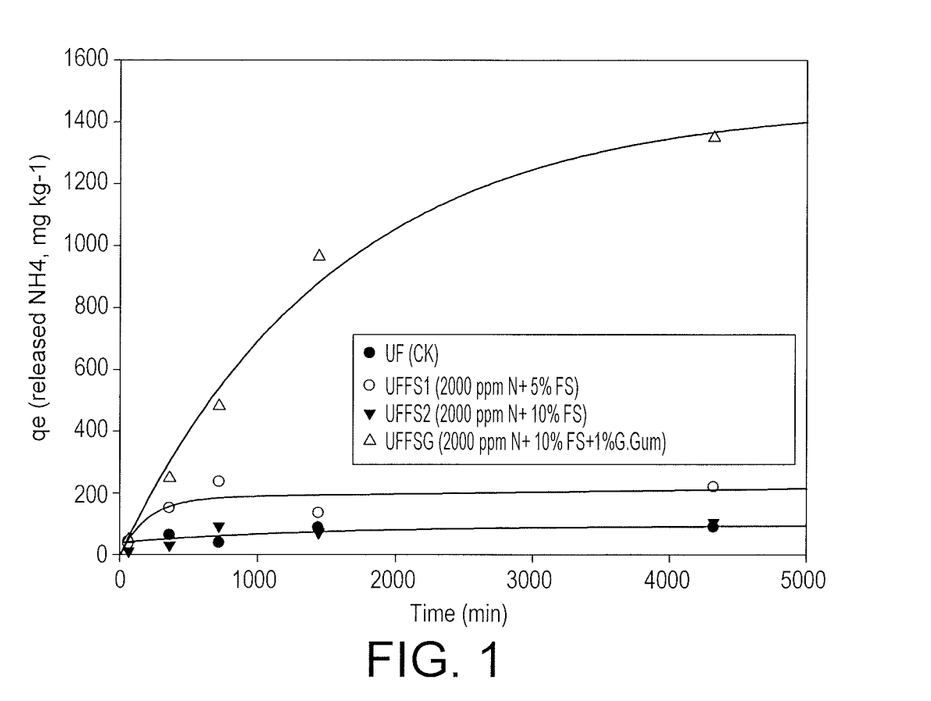
FIG. 1 is a graph of $NH_4^+$ released from a variety of formulations of encapsulated sustained release urea fertilizer over time.
Figure 2A:
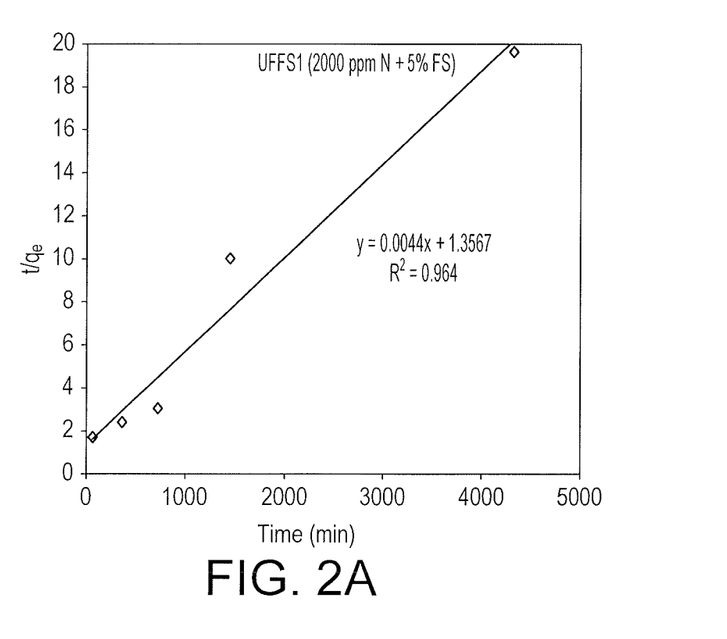
FIG. 2A is a graph of a pseudo second order model applied to the nitrogen release capability of urea fertilizer encapsulated in 5% fumed silica (UFFS1).
Figure 2B:
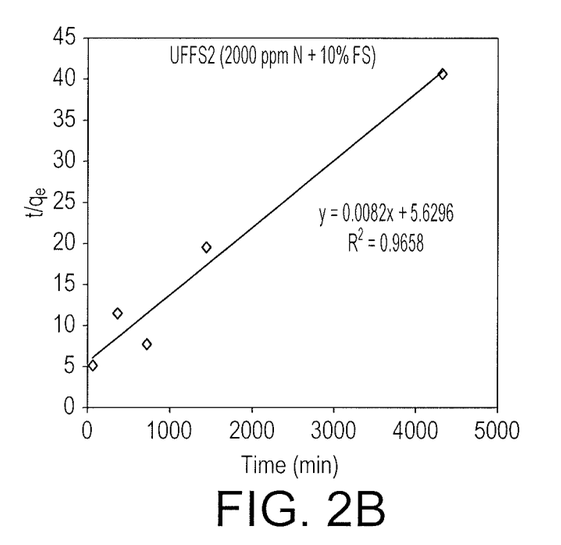
FIG. 2B is a graph of a pseudo second order model applied to the nitrogen release capability of urea fertilizer encapsulated in 10% fumed silica (UFFS2).
Figure 2C:
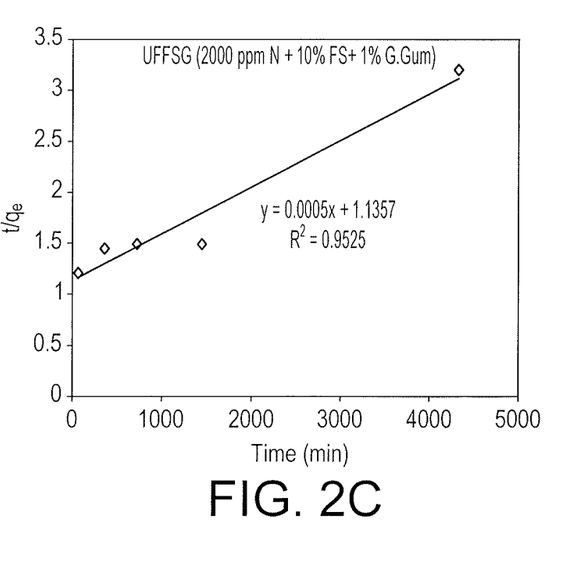
FIG. 2C is a graph of a pseudo second order model applied to the nitrogen release capability of urea fertilizer encapsulated in 10% fumed silica and 1% gellan gum hydrogels (UFFSG).
Figure 2D:
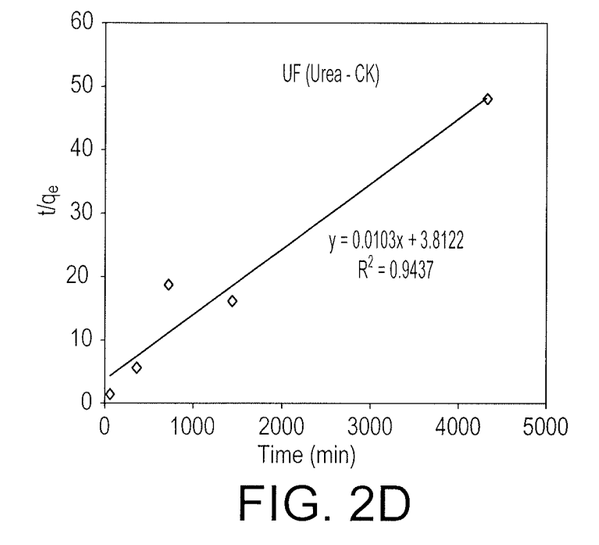
FIG. 2D is a graph of a pseudo second order model applied to the nitrogen release capability of the urea fertilizer (control) sample (UF).

This study considered the release of $NH_4^+$ by the UF, UFFS1, UFFS2, and UFFSG samples prepared as described in Example 1. FIG. 1 shows the amount, in $mg/kg^{-1}$, of $NH4^+$ released from each tested fertilizer over time. These results demonstrate that $NH4^+$ release was rapid in the initial stage, and the increased rate of $NH4^+$ release declined upon reaching equilibrium. The UFFSG sample (which included urea, gellan gum hydrogel and fumed silica) resulted in significantly higher $NH4^+$ release throughout the entire experimental period. This formulation released 49.1% of $NH4^+$ during the first 1,440 minutes, increasing to 67% after 4,320 minutes. Thus, the encapsulated gel-forming urea demonstrated improved $NH4^+$ release efficiency and slower continuous release as time progressed. This may be attributed to the dynamic viscoelasticity and rheological properties of gellan gum hydrogels in aqueous solution.

Four different kinetic models were applied to interpret the experimental data (see Table 2). The cumulative $NH_4^+$ released from the different formulations was well predicted by the pseudo-second order model ($R^2$=0.9437-0.9658). The plot of t/qt versus t for the pseudo-second order model resulted in very good straight lines, as shown in FIGS. 2A-2D. The pseudo-second order kinetic model showed that the value of the initial release rates (h) decreased in the following order: UFFSG (0.88)>UFFS1 (0.74)>urea [sample UF] (0.26)>UFFS2 (0.18). Meanwhile, the value of $q_e$ decreased in the following order: UFFSG (2000)>UFFS1 (227)>UFFS2 (121)>urea (97.1). The best prediction for the $NH_4^+$ release data by pseudo-second order model confirms chemical release of $NH_4^+$ in aqueous solution, which is a rate limiting step and is likely primarily due to urea dissolution. Parabolic diffusion was the best model to describe $NH_4^+$ release from UFFSG ($R^2$=0.9558), indicating diffusion-controlled phenomena via intra-particle diffusion or surface diffusion. The $k_p$ values in the parabolic diffusion model for $NH_4^+$ release were higher with the application of UFFSG than with other tested fertilizers in the order of UFFSG>UFFS1>UFFS2>urea. It was also found that the $NH_4^+$ release from UFFSG was well described by the power function model with $R^2$=0.9724. The $k_f$ values in the power function model and α value in the Elvoich function model were also higher for $NH_4^+$ release from UFFSG than the corresponding values of the other fertilizers. It appears that the diffusion process influenced $NH_4^+$ release from UFFSG to a higher extent than it did for the other tested fertilizers, as indicated by significantly higher $k_f$ values for UFFSG. These findings suggest that encapsulated fertilizers based on hydrogels and fumed silica exhibit excellent sorption properties, slow release of urea fertilizer and biodegradation properties, and may be applied in environmentally friendly agriculture.

TABLE 2

Kinetic Models of $NH_4^+$ Release from Encapsulated Fertilizer and Urea Control

| | Pseudo-second Order | | | | Power Function | | | Elvoich model | | | Intra-particle diffusion | | |
|---|---|---|---|---|---|---|---|---|---|---|---|---|---|
| Sample | h | $k_2$ | $q_e$ | $R^2$ | $k_f$ | b | $R^2$ | α | β | $R^2$ | $k_i$ | a | $R^2$ |
| UF | 0.262 | 0.0000278 | 97.09 | 0.944 | 0.1805 | 18.94 | 0.517 | 28.17 | 0.086 | 0.569 | 0.867 | 37.217 | 0.606 |
| UFFS1 | 0.737 | 0.0000143 | 227.27 | 0.964 | 0.4062 | 9.62 | 0.714 | 496.96 | 0.025 | 0.652 | 2.387 | 81.909 | 0.442 |
| UFFS2 | 0.178 | 0.0000119 | 121.95 | 0.966 | 0.5403 | 1.49 | 0.872 | 908.94 | 0.044 | 0.825 | 1.548 | 14.455 | 0.721 |
| UFFSG | 0.881 | 0.00000022 | 2000.00 | 0.953 | 0.8066 | 2.10 | 0.972 | 27472 | 0.003 | 0.893 | 23.454 | 121.18 | 0.956 | h = initial release rate (mg/kg/min);
$k_2$ = second order rate constant ((mg/kg)/0.5);
$q_e$ = release quantity of element time t (min);
$k_f$ = rate coefficient value (mg/kg/min);
β = release constant (mg/kg);
α = initial release rate (mg/kg/min);
$k_i$ = intra-particle diffusion rate (mg/kg/min);
a and b = constants.

Example 3

Column Experiments

Figure 3A:
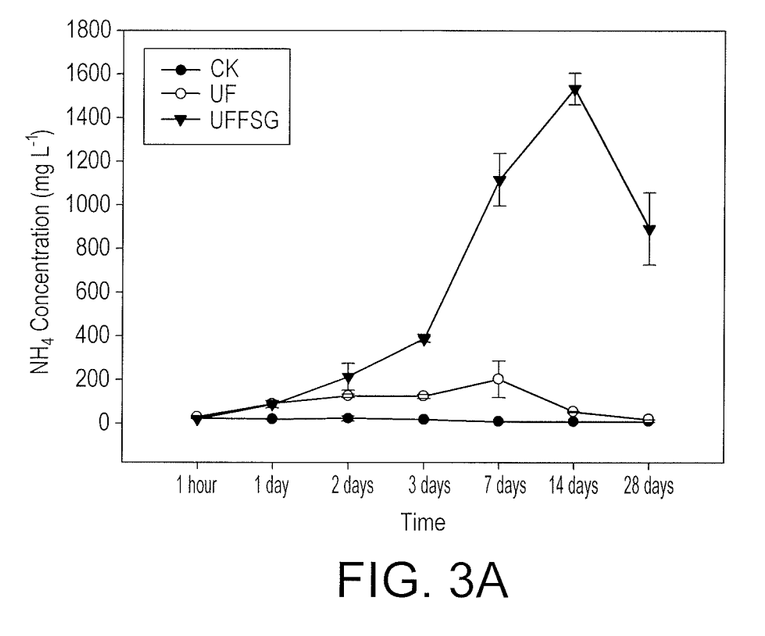
FIG. 3A is a graph of the $NH_4^+$ concentration in leachates from soil samples supplemented with regular soil (CK), urea fertilizer (UF), and urea fertilizer encapsulated in 10% fumed silica and 1% gellan gum hydrogels (UFFSG).

Column experiments were conducted to compare the downward movement of nitrogen forms ($NH_4^+ \rightarrow NO_3^- \rightarrow NO_2$) through soil columns treated with urea or with an encapsulated gel-forming urea. FIG. 3A shows the changes in $NH_4^+$ concentrations in collected leachates, which increased slightly over the first few days of column incubation (0-3 days). Thereafter, $NH_4^+$ concentrations increased to a maximum of up to 212.8 mg/L at 14 days after UFFSG treatment. Control soil (CK) showed 16.7 mg/L at day 14, while UF treated soil showed 78.8 mg/L. At day 28, the $NH_4^+$ concentrations in the UFFSG treated column were still 57.6 and 174.9 times higher than the UF and control-treated columns, respectively. The changes in water-extractable $NH_4^+$ cations from the upper layer (0-17.5 cm) and lower layer (17.5-35 cm) of soil samples in the columns were also investigated (see FIG. 3B).

Figure 3B:
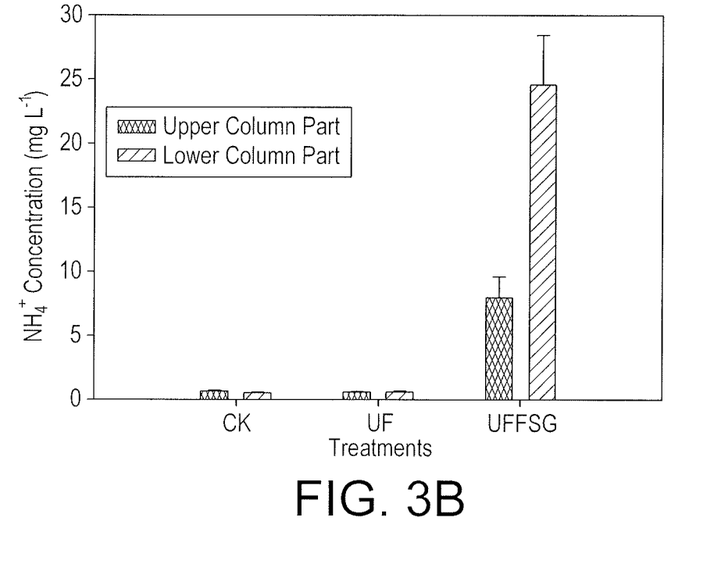
FIG. 3B is a chart of the $NH_4^+$ concentration in leachates from the upper column and the lower column of soil samples supplemented with regular soil (CK), urea fertilizer (UF), and urea fertilizer encapsulated in 10% fumed silica and 1% gellan gum hydrogels (UFFSG).
Figure 4A:
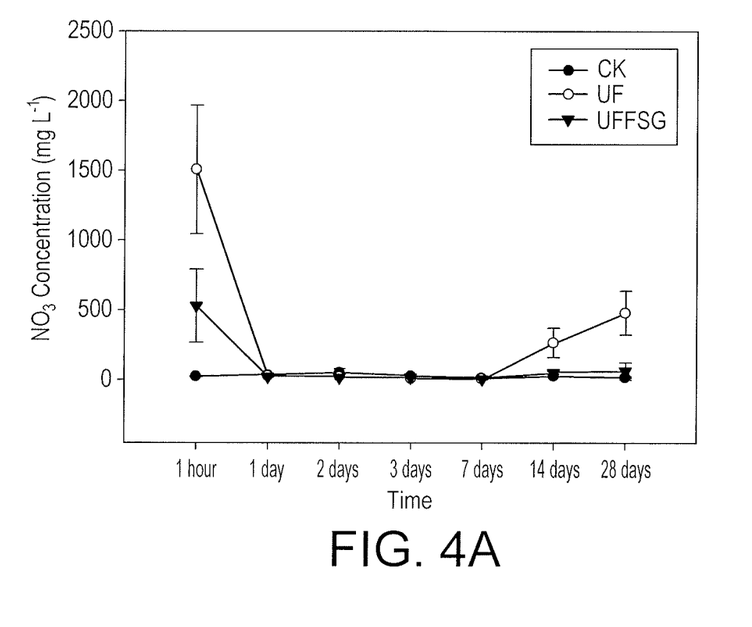
FIG. 4A is a graph of the $NO_3^-$ concentration in leachates of soil samples supplemented with regular soil (CK), urea fertilizer (UF), and urea fertilizer encapsulated in 10% fumed silica and 1% gellan gum hydrogels (UFFSG).
Figure 4B:
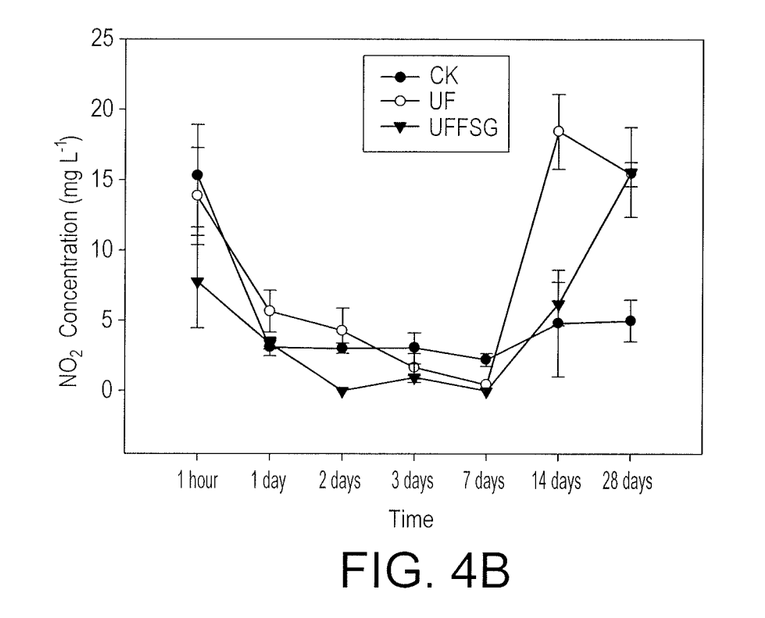
FIG. 4B is a graph of the $NO_2^-$ concentration in leachates of soil samples supplemented with regular soil (CK), urea fertilizer (UF), and urea fertilizer encapsulated in 10% fumed silica and 1% gellan gum hydrogels (UFFSG).
Figure 5A:
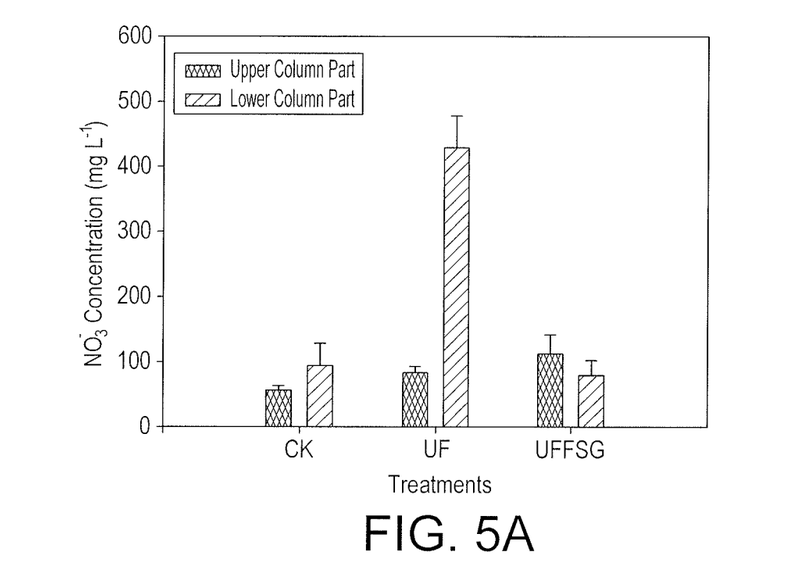
FIG. 5A is a chart of the $NO_3^-$ concentration in leachates from the upper column and the lower column of soil samples supplemented with regular soil (CK), urea fertilizer (UF), and urea fertilizer encapsulated in 10% fumed silica and 1% gellan gum hydrogels (UFFSG).
Figure 5B:
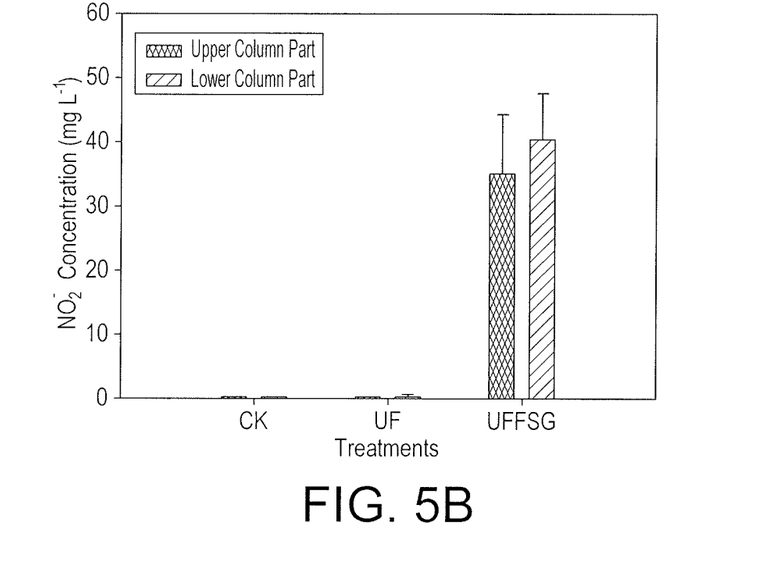
FIG. 5B is a chart of the $NO_2^-$ concentration in leachates from the upper column and the lower column of soil samples supplemented with regular soil (CK), urea fertilizer (UF), and urea fertilizer encapsulated in 10% fumed silica and 1% gellan gum hydrogels (UFFSG).

These experiments demonstrate that water-extractable $NH_4^+$ was very low in the upper and lower sections of the columns treated with the control soil or with UF, which may be due to $NH_4^+$ loss through volatilization or by leaching. However, the water extractable $NH_4^+$ in soil treated with UFFSG was higher overall, and was higher in subsurface layers than in surface layers. This may be the result of subsurface soil becoming rich in clay (which is negatively charged), or residues of gellan gum hydrogels and of fumed silica accumulating over the course of the experiment.

Gellan gum hydrogels and fumed silica residues may also decrease soil porosity and increase water-holding capacity. In this experiment, adding UFFSG increased water retention of the soil by up to 47.1%, suggesting enhanced levels of NH4+ in the soil solution.

Changes in $NO_3^-$ and $NO_2^-$ concentration in leachates and soil extracted by water are shown in FIGS. 4A-B and FIGS. 5A-B. The $NO_3^-$ concentration after one hour of column incubation accounted for 1,500 mg/L and 500 mg/L in soil treated with UF and UFFSG, respectively. $NO_3^-$ concentration reduced to a minimum in all treatments between day one and day seven. However, $NO_3^-$ concentration increased dramatically in leachates of soil treated with UF after 14 days of column incubation until the end of the experiment at day 28. $NO_2^-$ concentrations in leachates of soil treated with UF and UFFSG increased significantly only after 14 and/or 28 days. At the conclusion of this experiment, the soil $NO_3^-$ concentrations extracted by water in control, UF, and UFFSG were 55.4 mg/L, 83.3 mg/L, and 112.1 mg/L, in the upper layer, respectively. In the lower layer, they were 93.7 mg/L, 429.3 mg/L, and 79.4 mg/L, respectively.

Example 4

Water Holding Capacity and Saturated Hydraulic Conductivity

Figure 6:
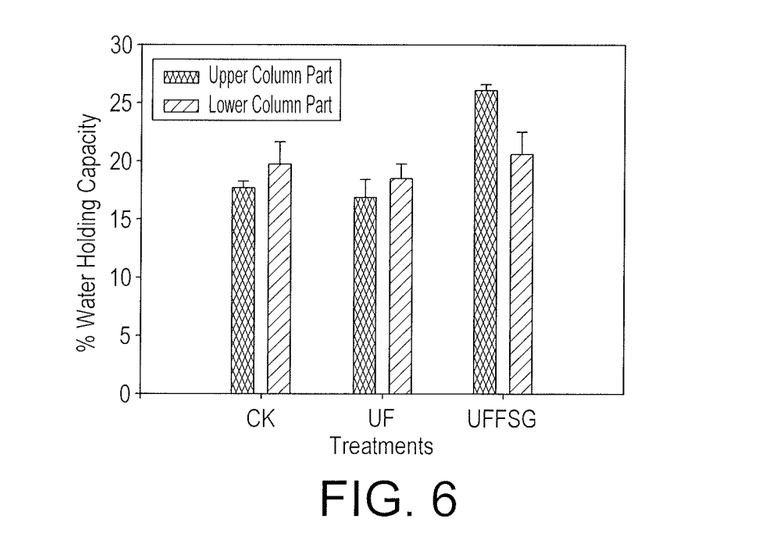
FIG. 6 is a chart of the percent water-holding capacity in leachates from the upper column and the lower column of soil samples supplemented with regular soil (CK), urea fertilizer (UF), and urea fertilizer encapsulated in 10% fumed silica and 1% gellan gum hydrogels (UFFSG).
Figure 7:
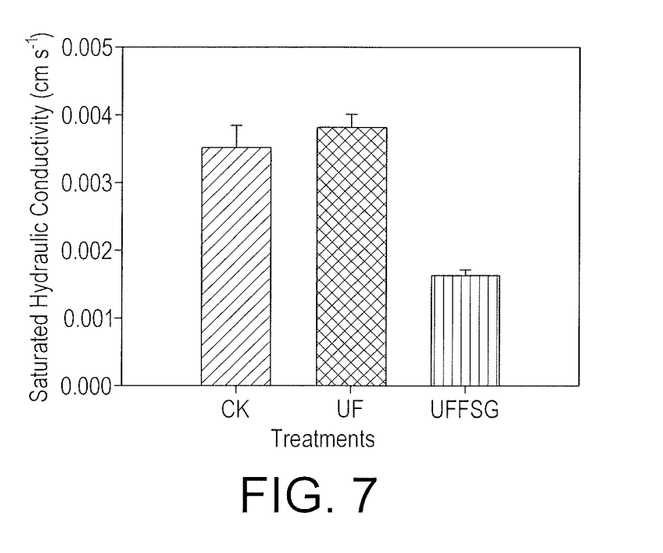
FIG. 7 is a chart of the saturated hydraulic conductivity in leachates of soil samples supplemented with regular soil (CK), urea fertilizer (UF), and urea fertilizer encapsulated in 10% fumed silica and 1% gellan gum hydrogels (UFFSG).

FIG. 6 and FIG. 7 show the effect of control soil, UF, and UFFSG treatments on water holding capacity and saturated hydraulic conductivity. Applying UFFSG increased the water holding capacity in the upper layer of soil from 17.6% in the control treatment and 16.8% in the UF treatment, to 26.1%. The water holding capacity in the lower section of the soil also increased from 19.8% in the control and 18.5% in the UF treatment to 20.6% in soil treated with UFFSG. These increases could be due to viscoelastic and high water retention characteristics of gellan gum hydrogels, or to decreases in soil porosity due to addition of fumed silica.

The saturated hydraulic conductivity was slightly increased from 0.00352 cm/s in the control treatment to 0.00383 cm/s in the UF treatment. These increases could result from increased soil salinity resulting from urea application. Saturated hydraulic conductivity was significantly decreased in soil treated with UFFSG, to 0.00163 cm/s. These changes likely resulted from the same factors discussed above for water holding capacity.

Example 5

Incubation Experiments

Figure 8A:
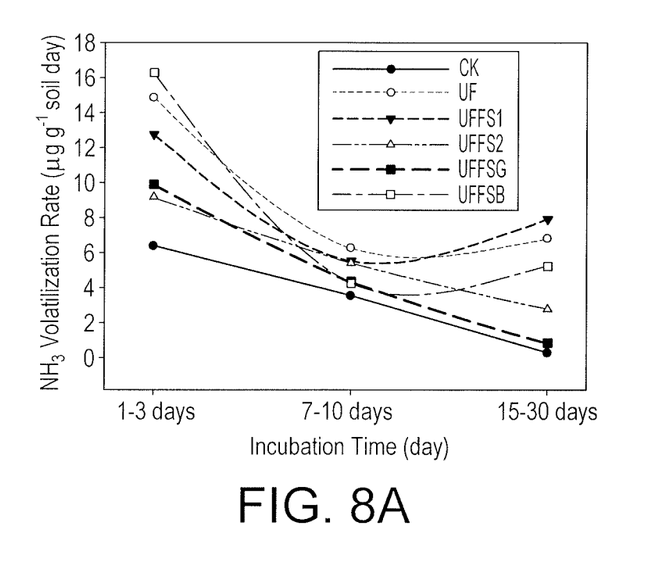
FIG. 8A is a graph of the $NH_3$ volatilization rate in leachates soil samples supplemented with regular soil (CK), urea fertilizer (UF), urea fertilizer encapsulated in 5% fumed silica (UFFS1), urea fertilizer encapsulated in 10% fumed silica (UFFS2), urea fertilizer encapsulated in 10% fumed silica and 1% gellan gum hydrogels (UFFSG), and urea fertilizer encapsulated in 10% fumed silica and 1% biochar (UFFSB).
Figure 8B:
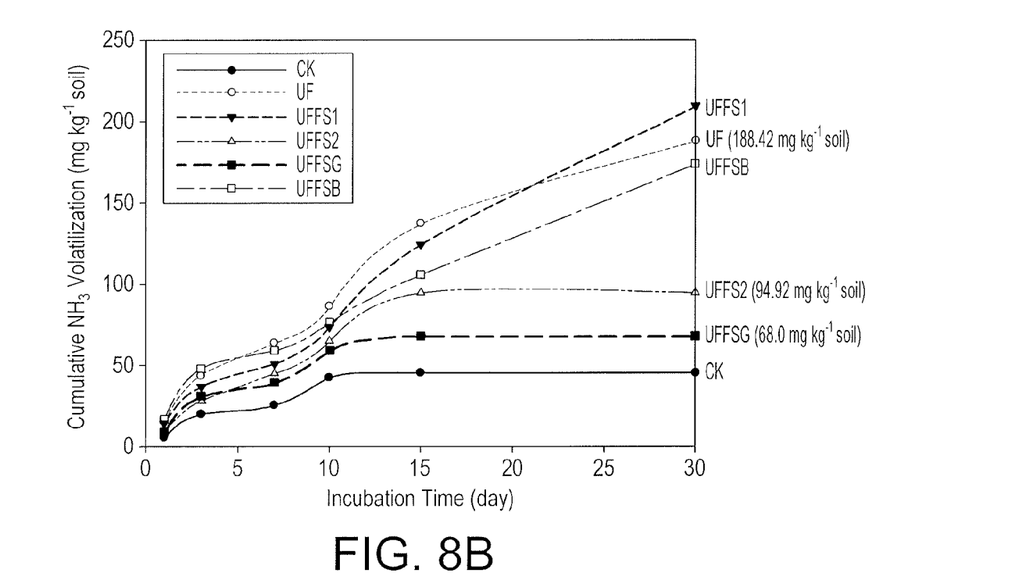
FIG. 8B is a graph of the cumulative $NH_3$ volatilization in leachates soil samples supplemented with regular soil (CK), urea fertilizer (UF), urea fertilizer encapsulated in 5% fumed silica (UFFS1), urea fertilizer encapsulated in 10% fumed silica (UFFS2), urea fertilizer encapsulated in 10% fumed silica and 1% gellan gum hydrogels (UFFSG), and urea fertilizer encapsulated in 10% fumed silica and 1% biochar (UFFSB).

Nitrogen loss through volatilization was tested over a 30-day period, comparing values for UFFS1, UFFS2, UFFSG, and UFFSB. FIG. 8A and FIG. 8B show the recorded $NH_3^-$ volatilization rate and cumulative total $NH_3^-$ volatilization, respectively. $NH_3^-$ volatilization rates were highest during the first three days, but tended to decline sharply as incubation progressed. The initial $NH_3^-$ rates were 6.38-16.29 μg/g soil/day, declining to 3.54-6.26 μg/g soil/day at day seven to day ten, and 0.28-7.93 μg/g soil/day at day fifteen to day thirty. Overall, the lowest rates of $NH_3^-$ volatilization were during the final incubation period. This may be due to higher amounts of biodegradable organic compounds at the outset, which could enhance the native bacteria in the soil, increasing urease activity. As incubation proceeded the easily biodegradable organic compounds may be consumed, resulting in lower microbial activity and lower $NH_3^-$ volatilization.

Overall, there were no significant differences in rate of volatilization between day fifteen and day thirty. However, cumulative $NH_3^-$ volatilization differed significantly between test groups. Over the period of the experiment, cumulative volatilization increased from 5.7 to 45.3 mg/kg soil for the control, from 15.6 to 188.4 mg/kg soil for UF, from 14.2 to 209.7 mg/kg soil for UFFS1, from 8.5 to 94.1 mg/kg soil for UFFS2, from 8.5 to 68 mg/kg soil for UFFSG and from 17 to 174.3 mg/kg soil for UFFSB. These results indicate that treatment with UF, UFFS1, and UFFSB significantly increased $NH_3^-$ volatilization. However, treatment with UFFS2 and UFFSG was not significantly different from the control treatment, suggesting no contribution to increased $NH_3^-$ volatilization. This confirms that modified urea fertilizers using 10% fumed silica, or 10% fumed silica and 1% gellan gum, could reduce $NH_3^-$ volatilization, preserving the urea and thereby extending the effective lifespan of the fertilizer. This effect may result from the higher concentration of fumed silica creating a thick outer shell around the fertilizer, thereby protecting the urea from volatilization. The thickness of this outer fumed silica shell and solubility of the contained urea could be further controlled by varying the amount of fumed silica and gellan gum hydrogel used.

It is to be understood that the encapsulated sustained release urea fertilizer is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. An encapsulated sustained release urea fertilizer, comprising a composition including:
    an aqueous solution of urea fertilizer, wherein the aqueous solution of urea fertilizer includes a stabilizer comprising gellan gum hydrogels thereby forming a stabilized urea solution; and
    fumed silica encapsulating the stabilized urea fertilizer solution.

2. The encapsulated sustained release urea fertilizer according to claim 1, wherein said fumed silica comprises hydrophobic nanoparticles of fumed silica.

3. The encapsulated sustained release urea fertilizer according to claim 1, wherein said urea fertilizer comprises 46% nitrogen by weight.

4. The encapsulated sustained release urea fertilizer according to claim 1, wherein said fumed silica comprises 5% wt/vol of said composition.

5. The encapsulated sustained release urea fertilizer according to claim 1, wherein said fumed silica comprises 10% wt/vol of said composition.

6. The encapsulated sustained release urea fertilizer according to claim 1, wherein said stabilizer comprises up to 1% wt/vol of said composition.

7. The encapsulated sustained release urea fertilizer according to claim 6, wherein said fumed silica comprises up to 10% wt/vol of said composition.

8. A process of making an encapsulated sustained release urea fertilizer, comprising the steps of:
    dissolving urea fertilizer in water to form a urea solution;
    adding a stabilizer to the urea solution, wherein the stabilizer comprises gellan gum hydrogels;
    adding fumed silica to the urea solution to form a pre-mix solution, wherein the stabilizer comprises 1% wt/vol of the pre-mix solution; and
    mixing the fumed silica and the stabilized urea solution for a period of time sufficient to encapsulate the urea solution in the fumed silica, thereby converting the urea solution into dry water form.

9. The process of making an encapsulated sustained release urea fertilizer according to claim 8, wherein said mixing step comprises mixing the fumed silica and the urea solution at 14,000 rpm for ten seconds.

* * * * *